United States Patent [19]

Nakashima et al.

[11] Patent Number: 4,637,773
[45] Date of Patent: Jan. 20, 1987

[54] INDUSTRIAL ROBOT OF THE ARTICULATED ARM TYPE

[75] Inventors: Seiichiro Nakashima; Kenichi Toyoda, both of Hino; Nobutoshi Torii, Hachioji; Ryo Nihei, Musashino, all of Japan

[73] Assignee: Fanuc Ltd., Yamanashi, Japan

[21] Appl. No.: 691,301

[22] PCT Filed: Apr. 27, 1984

[86] PCT No.: PCT/JP84/00218
§ 371 Date: Dec. 31, 1984
§ 102(e) Date: Dec. 31, 1984

[87] PCT Pub. No.: WO84/04269
PCT Pub. Date: Nov. 8, 1984

[30] Foreign Application Priority Data

Apr. 30, 1983 [JP] Japan .................................. 58-74955

[51] Int. Cl.[4] ................................................ B25J 9/00
[52] U.S. Cl. .................................... 414/732; 414/736; 414/7; 901/21; 901/29; 74/89.2
[58] Field of Search .................... 74/89.2, 89.21, 89.22, 74/96, 470; 474/148–150; 414/1–8, 752, 753, 755, 732, 735; 901/21, 29

[56] References Cited

U.S. PATENT DOCUMENTS 4,299,533 11/1981 Ohnaka .............................. 901/21 X
4,503,722 3/1985 Suzuki et al. ...................... 414/7 X Primary Examiner—Terrance L. Siemens
Attorney, Agent, or Firm—Armstrong, Nikaido, Marmelstein & Kubovcik

[57] ABSTRACT

An industrial robot of the articulated arm type comprises a movable robot body (11) arranged on a base (10). An upper arm (13) having root and tip portions is rotatably pivoted to the robot body (11) at the root portion thereof. A forearm (16) having rear and front ends is rotatably pivoted to the tip portion of the upper arm (13) at a portion between the rear and front ends. Preferably, a wrist assembly (20) includes two moving elements (21,22) which are rotatable about different axes in relation to the front end of the forearm (16). The moving elements (21,22) of the wrist assembly (20) are rotated about the corresponding axes by means of wrist drive units (27, 28), respectively. The wrist drive units (27, 28) include first sprockets (29, 36), respectively, each rotatably arranged in the rear end of the forearm (16). Drive motors (31, 37), each rotating the first sprockets (33, 39), are arranged on the rear end of the forearm (16), respectively. Second sprockets (33, 39) are operatively coupled with the wrist assembly (20) and arranged in the front end of the forearm (16). Rotational movements of the first sprockets (29, 36) are transmitted through wrapping connectors (34, 45) to the second sprockets (33, 39), respectively. The wrapping connectors (34, 45) are of endless assemblies which include chains (46, 47) and rods (48, 49), respectively.

4 Claims, 4 Drawing Figures

INDUSTRIAL ROBOT OF THE ARTICULATED ARM TYPE

DESCRIPTION

Technical Field

The present invention relates to an industrial robot, more particularly to an industrial robot of the articulated arm type.

BACKGROUND

Known industrial robots of the articulated arm type generally are provided with a movable robot body arranged on a base. A first arm or upper arm having root and tip portions is rotatably pivoted to the robot body at the root portion. A second arm or forearm having rear and front ends is rotatably pivoted to the top portion of the upper arm at a portion between the rear and front ends. Generally, a wrist assembly arranged at the front end of the forearm includes two or three moving elements which are rotatable about different axes. The moving element forming the output end of the robot is adapted to support, a robot hand, welding gun, painting gun, or other working attachment. The moving elements of the wrist assembly are driven by independent wrist drive units about the corresponding axes. Conventional wrist drive units generally comprise a first sprocket arranged in the upper arm, a drive motor arranged on the upper arm and coupled with the first sprocket to rotate the first sprocket, a second sprocket arranged where the forearm is pivoted to the upper arm, a third sprocket arranged in the tip portion of the forearm and operatively coupled with the corresponding moving element of the wrist assembly, an endless chain for transmitting rotational movement of the first sprocket to the second sprocket, and another endless chain for transmitting rotational movement of the second sprocket to the third sprocket.

In the conventional articulated robots with the wrist drive units as mentioned above, many power-transmission components are used between the drive motors and the moving elements of the wrist assembly. Since a chain generally has low rigidity, known robots in which chains account for a large part of the wrist drive unit have a disadvantage of low rigidity against loads acting on the wrist assembly. Furthermore, conventional robots in which chains account for a large part of the wrist drive unit have a disadvantage of a lower accuracy in positioning of the output end of the wrist assembly due to chain elongation due to wear.

DISCLOSURE OF THE INVENTION

An object of the present invention is to provide an industrial robot of an articulated arm type with a wrist drive unit made of few parts.

Another object of the present invention is to provide an industrial robot of the articulated arm type which has high rigidity against loads acting on the wrist assembly.

According to the present invention, there is provided an industrial robot of the articulated arm type comprising: a movable robot body arranged on a base; an upper arm having root and tip portions and rotatably pivoted to said robot body at said root portion; a forearm having rear and front ends and rotatably pivoted to said tip portion of said upper arm at a position between said rear and front ends; a wrist assembly arranged on said front end of said forearm and rotatable in relation to said front end about at least one axis; and at least one wrist drive unit for driving said wrist assembly and rotating it about said axis, said wrist drive unit including a first sprocket which is rotatably arranged in said rear end of said forearm, a drive motor arranged on said rear end of said forearm and coupled with said first sprocket to rotate it, a second sprocket arranged in said front end of said forearm and operatively coupled with said wrist assembly, and a wrapping connector for transmitting rotational movement of said first sprocket to said second sprocket.

Preferably, said wrapping connector includes a first chain meshing with said first sprocket, a second chain meshing with said second sprocket, and a pair of rods for connecting the two ends of said first chain to the two ends of said second chain, respectively. This construction increases the rigidity of the wrapping connector.

Preferably, said wrapping connector further includes means for absorbing any elongation of said first and second chains, which means includes at least one tensioner interposed between at least one of said chains and at least one of said rods. This construction improve the accuracy in positioning of the wrist assembly.

Preferably, said forearm is provided with a pair of guide members each slidably supporting each of said rods in a longitudinal direction thereof. This allows the rods to be smoothly guided with the guide members.

Further preferably, said upper arm is pivoted to said robot body and rotatable about a first axis and said forearm is pivoted to said upper arm and rotatable about a second axis perpendicular to said first axis. Further, said wrist assembly comprises a first moving element, arranged on the front end of said forearm and rotatable about a third axis perpendicular to said second axis, and a second moving element, as an output end of the robot arranged on said first moving element and rotatable about a fourth axis perpendicular to said third axis. The second moving element is capable of attaching thereon a robot hand, welding gun, painting gun, or other working attachment.

The above-mentioned and other objects and features of the present invention will become apparent from the following detailed description with reference to the attached drawings.

BEST MODE OF CARRYING OUT THE INVENTION

Figure 1:
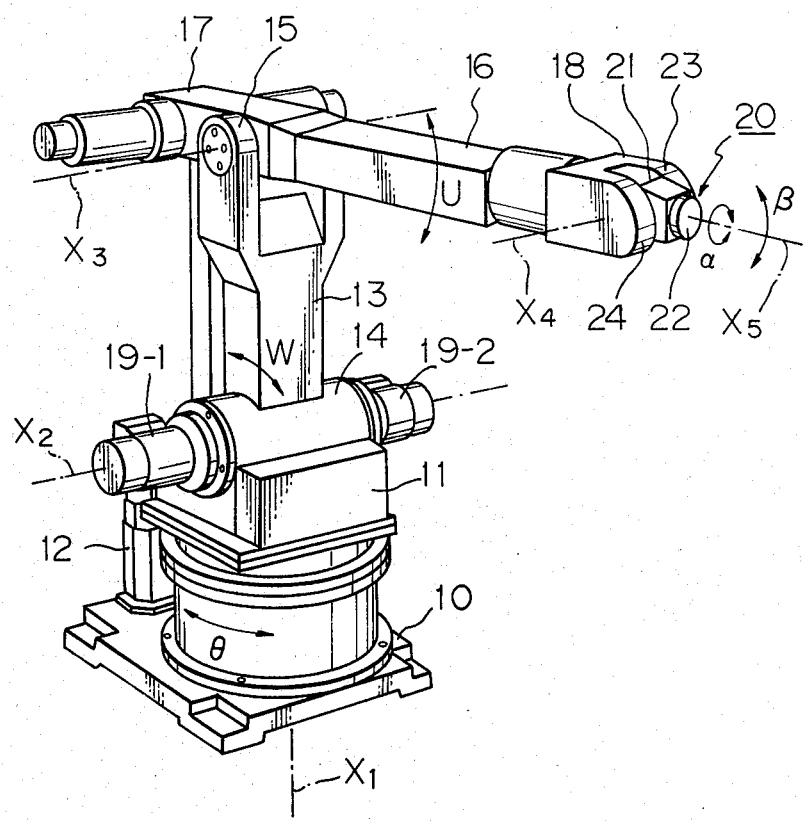
FIG. 1 is an overall perspective view of an industrial robot of the articulated arm type illustrating an embodiment of the present invention.

Referring to FIG. 1, the industrial robot of the articulated arm type comprises a movable robot body 11 which is mounted on a base 10. The robot body 11 is rotatable in a direction of arrow $\theta$ about an axis $X_1$ which is perpendicular to the mounting surface of the base 10. The robot body 11 can be arranged on the base 10 so as to move reciprocally and linearly in a direction parallel to the mounting surface of the base 10. The base 10 is provided with a servo motor 12 for rotating the robot body 11. An upper arm 13 having a root portion 14 and a tip portion 15 is rotatably pivoted at its root portion 14 to the robot body 11. The upper arm 13 is rotatable in a direction of arrow W about an axis $X_2$ perpendicular to the axis $X_1$. A servo motor 19-1 for rotating the upper arm 13 is mounted on the robot body 11. A forearm 16 having a rear end 17 and a front end 18 is rotatably pivoted to the fork-shaped tip portion 15 of the upper arm 13 at a position between the rear end 17 front end 18. The forearm is rotatable in a direction of arrow U about an axis $X_3$ parallel to the axis $X_2$. A servo motor 19-2 for rotating the forearm 16 is mounted on the robot body 11 and arranged coaxially with the servo motor 19-1 for the upper arm 13.

A wrist assembly generally indicated by reference numeral 20 is arranged on the front end 18 of the forearm 16. In this embodiment, the wrist assembly 20 is composed of a first moving element 21, rotatable in relation to the front end 18 of the forearm 16 in a direction of arrow $\beta$ about an axis $X_4$ parallel to the axis $X_3$, and a second moving element 22 as a wrist tip portion, rotatable in relation to the first moving element 21 in a direction of arrow $\alpha$ about an axis $X_5$ perpendicular to the axis $X_4$. The second moving element 22 is capable of attaching thereon a robot hand, welding gun, painting gun, or other working attachment (not shown).

Figure 2:
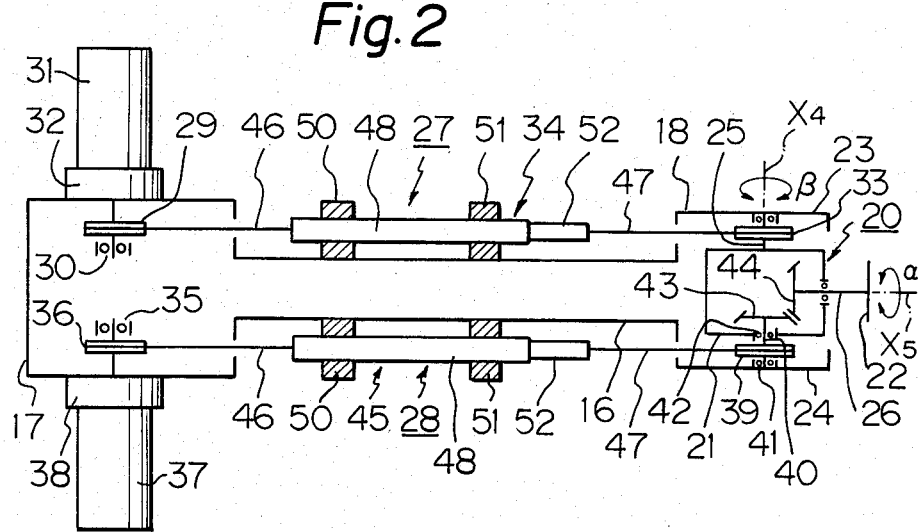
FIG. 2 is a sectional plan view schematically illustrating the wrist drive units of the robot shown in FIG. 1.

Referring to FIG. 2, the forearm 16 is provided at its front end 18 with two supports 23 and 24 having a forked shape, the first moving element 21 of the wrist assembly 20 comprising a casing arranged between the supports 23 and 24. A shaft 25 fixed to the casing 21 extends along the axis $X_4$ and is rotatably supported by the support 23 of the forearm 16 through a bearing. A shaft 26 fixed to the wrist tip portion 22 extends along the axis $X_5$ and is rotatably supported on the casing 21 through a bearing.

The articulated-arm-type industrial robot further comprises two wrist drive units 27 and 28 for rotating the moving elements 21 and 22, respectively, about the corresponding axes. The wrist drive unit 27 for the casing 29 includes a first sprocket 21 rotatably supported in the rear end 17 of the forearm 16 through a bearing 30. A servo motor 31 is mounted on the rear end 17 of the forearm 16 as a drive motor for rotating the first sprocket 29. An output shaft of the motor 31 is coupled with the first sprocket 29 through a speed reduction gear 32. A second sprocket 33 is arranged in the support 23 of the front end 18 of the forearm 16. This second sprocket 33 is fixed to the shaft 25 of the casing 21 of the wrist assembly 20. The first sprocket 29 is coupled with the second sprocket 33 through a wrapping connector 34 for transmitting rotational movement.

Similarly, the wrist drive unit 28 for the wrist tip portion 22 includes a first sprocket 36 which is rotatably supported in the rear end 17 of the forearm 16 through a bearing 35. A servo motor 37 is mounted on the rear end 17 of the forearm 16 as a drive motor for rotating the first sprocket 36. An output shaft of the motor 37 is coupled with the first sprocket 36 through a speed reduction gear 38. A second sprocket 39 is arranged in the support 24 of the front end 18 of the forearm 16. This second sprocket 39 is fixed to a shaft 40. The shaft 40 extends along the axis $X_4$ and is rotatably supported by the support 24 through a bearing 41. The casing 21 is rotatably supported on the shaft 40 through a bearing 42. In the casing 21, a bevel gear 43 fixed to the shaft 40 meshes with a bevel gear 44 fixed to the shaft 26. The first sprocket 36 is coupled with the second sprocket 39 through a wrapping connector 45 for transmitting rotational movement.

The construction of the wrapping connector 34 is substantially the same as that of the wrapping connector 45, so only the construction of the connector 45 is described hereinafter. The corresponding components of the connector 34 are denoted by the same reference numerals.

Figure 3:
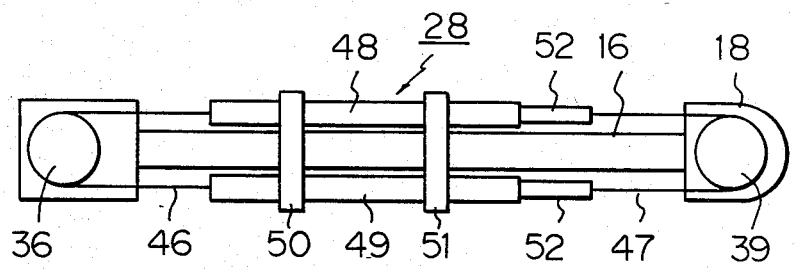
FIG. 3 is a side view schematically illustrating the wrist drive unit shown in FIG. 2.
Figure 4:
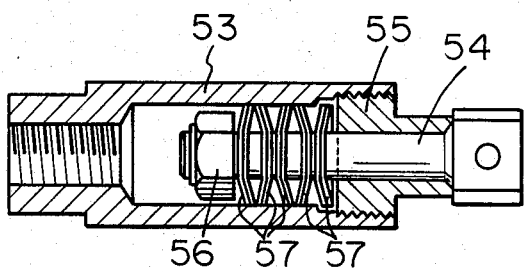
FIG. 4 is an enlarged sectional view of the tensioner used in the wrist unit shown in FIG. 2.

Referring to FIGS. 2 and 3, the wrapping connector 45 comprises a first chain 46 meshing with the first sprocket 36, a second chain 47 meshing with the second sprocket 39, and a pair of rods 48 and 49 for connecting the two ends of the first chain 46 and the two ends of the second chain 47, respectively. The rods 48 and 49 are made of rigid materials such as metal. The forearm 46 is provided with guide members 50 and 51 each slidably supporting the rods 48 and 49 in a longitudinal direction thereof. A bushing (not shown) may be arranged on the inner surface of each of the guide members 50 and 51 for guiding more smoothly the rods 48 and 49, respectively. Furthermore, the wrapping connector 45 includes means for absorbing any elongation of the first chain 46 and the second chain 47. The means includes two tensioners 52 arranged between the rods 48 and 49 and the second chain 47. The tensioners 52 apply a constant tensile force to the chains 46 and 47. As shown in FIG. 4, the tensioners 52 include a cylindrical member 53 connected to the rod and a rod member 54 connected to the chain. The rod member 54 extends into the cylindrical member 53 through a rod guide 55 mounted on the cylindrical member 53. In the cylindrical member 53, the rod member 54 is provided at its tip portion with a flange or nut 56. Between the nut 56 and the rod guide 55, a plurality of coned disc springs 57 are engaged in a compressed state with the rod member 54 in an axial direction, the coned disc springs 57 apply a constant tensile force to the chains. Any elongation of the chains due to wear of the chains is absorbed by the spring force of the coned disc springs 57.

As mentioned above, the wrapping connector 34 has the same construction as the wrapping connector 45.

The rotational movement of the first sprocket 29 provided by the motor 31 is transmitted through the wrapping connector 34 to the second sprocket 33. By this, the casing 21 of the wrist assembly 20 is rotated about the axis $X_4$. The rotational movement of the first sprocket 36 provided by the motor 37 is transmitted through the wrapping connector 45 to the second sprocket 39. The rotational movement of the second sprocket 39 is transmitted through the bevel gears 43 and 44 to the wrist tip portion 22 of the wrist assembly 20. By this, the wrist tip portion 22 is rotated about the axis $X_5$ The rotational movements of the casing 21 and of the wrist tip portion 22 are limited, respectively, to within the range of a predetermined stroke of not more than one rotation. It is desirable to shorten the length of the chains 46 and 47 as much as possible, therefore, it is preferable to select the minimum length of each of the chains necessary for the rotational stroke of the casing 21 and the wrist tip portion 22.

The transmission of rotational movement by use of the sprockets and chains results in continuous pulsatory movement of the chains 46 and 47 and fluctuations in their height in the radial direction of the sprocket. However, the rods 48 and 49 are slidably supported by the guide members 51 in the wrapping connectors 34 and 45, respectively, as stated above, so the vibration of the wrapping connectors 34 and 45 is minimized.

Since the motors 31 and 37 of the two wrist drive units 27 and 28 are mounted on the upper arm 16, the power transmission between the motors 31, 37 and the moving elements 21, 22 of the wrist assembly 20 can be effected by the minimum number of the sprockets and wrapping connectors. Since part of the wrapping connectors 34 and 45 consists of the rods 48 and 49, elongation of the wrapping connectors 34 and 45 can be reduced and, therefore, the rigidities of the drive systems against loads acting on the wrist assembly can be increased. That is, the rigidity of the wrist assembly can be increased. Since the tensioners 52 absorb any elongation of the chains 46 and 47 of the wrapping connectors 34 and 45, respectively, the accuracy in positioning of the elements 21 and 22 of the wrist assembly 20 is positively prevented from being deteriorated.

The motors 31 and 37 of the two wrist drive units 27 and 28 are installed at the rear end of the forearm 16 rather than at the pivoted position of the forearm 16 to the upper arm 13. Consequently, the rotational moment acting on the pivoted portion of the forearm 16 is minimized.

Although the foregoing explanation has been made in reference to one embodiment of the present invention, the present invention is not limited to the above-mentioned embodiment. Many modifications and variations may be made without departing from the scope of the claims of the present invention. For example, the wrist assembly may include three moving elements rotationally moving about three axes, respectively. In this case, the above-mentioned construction may be applied to the three drive systems for the moving elements. Further, the tensioner may be arranged at any given position in the wrapping connector.

CAPABILITY OF EXPLOITATION IN INDUSTRY

The industrial robot of the articulated arm type according to the present invention can be used as a work robot for many kinds of operations, such as an assembly of work, welding, and painting.

We claim:

1. An industrial robot of the articulated arm type comprising:
    a movable robot body arranged on a base;
    an upper arm having root and tip portions and rotatably pivoted to said robot body at said root portion;
    a forearm having rear and front ends and rotatably pivoted to said tip portion of said upper arm at a portion between said rear and front ends;
    a wrist assembly arranged on said front end of said forearm and rotatable in relation to said front end about at least one axis; and
    at least one wrist device unit for driving said wrist assembly and rotating it about said axis, said wrist drive unit including a first sprocket which is rotatably arranged in said rear end of said forearm, a drive motor arranged on said rear end of said forearm and coupled with said first sprocket to rotate it, a second sprocket arranged in said front end of said forearm and operatively coupled with said wrist assembly, and a wrapping connector for transmitting rotational movement of said first sprocket to said second sprocket;
    said wrapping connecting including a first chain meshing with said first sprocket, a second chain meshing with said second sprocket, a pair of rods connecting the two ends of said first chain to the two ends of said second chain, respectively, and means for absorbing elongation of said first and second chains;
    said means for absorbing elongation of said first and second chains including at least one tensioner interposed between at least one of said rods and at least one of said chains for providing a constant tensile force to said chains, said at least one tensioner comprising a cylindrical member connected to said at least one of said rods, a rod member connected to said at least one of said chains, a rod guide adjustable mounted in said cylindrical member, said rod member extending through said rod guide and having one end in said cylindrical member, and a plurality of coned disc springs surrounding said rod member interposed in a compressed state between said one end of said rod member and said rod guide.

2. An industrial robot according to claim 1, wherein said means for absorbing elongation comprises two tensioners interposed between the two ends of the second chain and the pair of rods.

3. An industrial robot according to claim 1, wherein said forearm is provided with a pair of guide members for slidably supporting said rods, respectively, in a longitudinal direction thereof.

4. An industrial robot according to claim 1, wherein said upper arm is pivoted to said robot body and rotatable about a first axis, said forearm is pivoted to said upper arm and rotatable about a second axis parallel to said first axis, and said wrist assembly comprises a first moving element, arranged on said front end of said forearm and rotatable about a third axis parallel to said second axis, and a second moving element, arranged on said first moving element and rotatable about a fourth axis perpendicular to said third axis.

* * * * *